FIG. 1.

United States Patent Office 3,512,064
Patented May 12, 1970

3,512,064
NUMERICAL MACHINE TOOL WITH POLYPHASE POSITION DETECTOR WITH MEANS SELECTING PARTICULAR PHASE AND MEANS PREVENTING EXCESSIVE LAG
Kiyokazu Okamoto, Hajime Iida, Hiroshi Shinagawa, Masahiro Yoshioka, and Takeo Ando, Tokyo, Japan, assignors to Nippon Electric Company, Limited, Tokyo, Japan
Filed Aug. 5, 1968, Ser. No. 750,049
Claims priority, application Japan, Aug. 3, 1967, 42/49,867
Int. Cl. H02p 1/54
U.S. Cl. 318—18
7 Claims

ABSTRACT OF THE DISCLOSURE

A system for controlling the droop between a controlled member such as a machine tool and command information is maintained within prescribed limits. The digital system applies command pulses at a rate inversely proportional to the desired command rate. The controlled member is driven by suitable driving means which controls the operation of a polyphase detector capable of generating a plurality of signals of differing phases, one of which is selected by a phase selection circuit in accordance with the command pulses and direction, which selected phase signal after phase discrimination and amplification is employed to operate the driving means. One of the phase signals having a specific phase relationship to the phase signal operating the driving means is selected to generate a phase alarm signal which is produced whenever the phase alarm signal is negative relative to a predetermined reference level signal to generate a control signal which inhibits the application of command pulses to the phase selector until the droop falls within prescribed limits. The system is effective in maintaining the droop within the prescribed limits for either acceleration or deceleration commands applied to the controlled member. Command pulses are then reapplied to the phase selector as soon as the detected droop falls within the prescribed range.

The present invention relates to digital driving equipment and more particularly to an improved positioning phase digital driving system in which the value of droop between a desired command rate and the actual position of the controlled member is maintained within a prescribed range.

Conventional positioning phase digital driving equipment may be roughly classified within three catagories, viz. phase modulation systems, stepping motor systems and positioning phase systems. Such systems normally comprise:

a distribution command device which generates a distribution command signal at a rate inversely proportional to the command feed rate and under control of first information applied from an outside source to the distribution command device to prescribe the command feed rate for a controlled member;

a distributor which generates a distribution signal that indicates each step variation and the direction of the position of the controlled member, which employs second information that specifies the method of distribution, whenever the distributor receives the controlled distribution command signal;

a driving means comprising a polyphase detector mechanically coupled (usually through gear means) to a driving means, for generating a plurality of detection signals having respectively predetermined phase differences;

a positioning phase selector which successively selects a positioning phase signal, phase by phase, from among said detection signals in response to said distribution signal;

a phase discriminator and power amplifier for driving the driving member which is interlocked with the control member, in response to said positioning signal, so as to produce an error signal corresponding to the value of the positioning phase signal which has a value close to zero.

A principal object of the present invention is to provide an improved digital driving system which eliminates the defects to be described in more detail hereinafter and which occur during acceleration or deceleration of the conventional digital driving equipment, viz. at the time the difference of both feed rates—it is the command feed rate for the controlled member which is proportional to the occurrence/time ratio of the distribution command signal, which is one feed rate; and the actual feed rate of said controlled member which is the other feed rate—is relatively high. More specifically, one defect which occurs in the case where a D.C. motor for instance is used as a feed motor which is a component of the driving equipment, due to the ratio of generated torque of the feed motor verses the inertia (hereinafter abbreviated as torque/inertia) of the driving system— viz. a mechanically movable part centering around said feed member and said controlled member coupled mechanically to said feed motor—is smaller at the time of acceleration, than the rise time—which the driving system requires until it has stored a kinetic energy corresponding to the command feed rate which undergoes said generated torque—becomes long, and as a result, although the mechanical distortion is relatively small, the difference between the commanded position of the controlled member of which position is represented by the number of distribution signals and the actual position of the controlled member, viz. droop, increases abruptly, and in the worse case, it becomes impossible for the controlled member to follow the commanded position. A second defect which occurs when, for example, a stepping motor or an oil pressure motor is used as a feed motor, is that case when the torque/inertia of the driving system is considerably large, and the rise time is justified to be quite short, and hence the droop falls in a narrow range, causing mechanical distortion to develop rather abruptly in the driving system.

Conventional positioning phase digital driving systems apply only information regarding the positioning phase signal to the positioning control. Quite to the contrary, the digital driving system of the present invention employs a new principle for the purpose of improving the above mentioned defect by providing, in addition to the use of information due to said positioning phase signal, an alarm phase signal having a predetermined phase relationship relative to the positioning phase signal which alarm signal is selected from among the detection polyphase signals generated. The alarm phase signal under certain circumstances generates an alarm signal which in turn generates a distribution control signal when the alarm signal is in a prescribed relationship with a predetermined reference signal level to thereby generate the controlled distribution command signal in accordance with the distribution control signal. The controlled distribution command signal is supplied to the distributor instead of the distribution command signal.

Thus the object of the present invention is that of providing a polyphase selection digital driving system in combination with a simplified structure for the purpose of making it possible not only to hold the droop within the prescribed limits but also to hold in check any increases in mechanical distortion which may be developed in the driving system.

The objectives of the present invention are achieved by providing:

a first means which selects the alarm phase signal from among the polyphase detection signals generated;

a second means which generates the alarm signal;

a third means which generates the distribution control signal; and a fourth means which applies the controlled distribution command signal—which controlled distribution command signal is generated by controlling the distribution command signal with the distribution control signal—instead of applying the distribution command signal directly to the distributor.

The present invention is effective in following up in a highly accurate manner the above-described commanded position of the controlled member. According to the present invention, the distribution command signal is controlled by the distribution control signal so that the droop may be held within the prescribed range even though a conventional electric motor may be used as a feed motor instead of a stepping motor or an oil pressure motor.

When in contour numerical control—for instance, in which two digital systems are respectively provided for an X axis and a Y axis and each distribution signal for the X and Y axes are respectively supplied to the X-axis and Y-axis driving systems, and a predetermined function is established for the sum of the number of distribution signals of the respective axes, and in which the positioning control of the controlled member is carried out along a curve in the XY plane which is represented by said function; and in this case the droop of the X and Y axes represent respectively an X and a Y component of the deviation of the actual position of the controlled member from the commanded position on said curve—is carried out, the conventional digital driving equipment which uses an electric motor is not capable of maintaining the droops within the prescribed values, while the equipment employing the present invention has marked effectiveness in providing the above-described high accuracy follow-up characteristics.

In a system which has been proposed for the purpose of holding the droop within a prescribed range, for instance, in a system where each of the "servo devices (provided with a function equivalent to the driving equipment of the present invention)" is furnished with a "reversible binary counter" as is described in additional Note 14 of Patent Gazette '61–19195, entitled "Control Method of Relative Motion by Using Pulses Specifically for Machine Tools," and said "counter" counts in the command direction a "normalized component pulse train (corresponding to the distribution signal of the present invention)" and also counts a negative feedback pulse train (position detection pulses) generated (generated each time the controlled member which is driven by a motor, is moved only through a prescribed unit amount) by an electric motor, and discontinues the "composite pulse train" of the above described pulse trains at the proper time (described in additional Note 13, for instance, at the time the value droop) registered in said counter becomes larger than the prescribed value. A system of this type has the defect of being large in size and complexity due to the necessity of the reversible counter, a control circuit therefor, a position detection pulse generator, a synchronizing circuit of the position detection pulses, and so forth.

Systems employing position detection pulses have the defect of tending to be effected by noise pulses due to induction in environments having poor electrical conditions since it is difficult to electrically distinguish noise pulses due to induction from the normal position detection pulses. To the contrary, the system according to the present invention has a highly simplified structure due to the elimination of the need for the above mentioned reversible counter and associated complex circuitry, and it is not affected at all by noise pulses due to induction since the system of the present invention uses a means for producing polyphase detection signals which are produced with levels instead of using the position detection pulse generator.

Another advantage of the present invention is in producing a smooth drive by sharply reducing mechanically distortion generated when the driving system is either accelerated or decelerated. For example, when a stepping motor or an oil pressure motor is used as a feed motor, in a system where the driving system is accelerated or decelerated by adjusting at the rate of an exponential function the occurrence/time ratio of the above-described distribution command signal in a one sided manner regardless of the inertia of the driving system for the purpose of preventing the sharp increase of mechanical distortion developed in the driving system, the mechanical distortion energy is increased sharply until the driving system has stored the kinetic energy corresponding to the command feed rate whereby the feed motor becomes effected by the generated torque due to the difference between the actual mechanical time constant of the driving system and the time constant of the above-described exponential function which difference is not necessarily small. In the present invention, since the distribution command signal is controlled according to the alarm signal selected from among the polyphase detection signal through the position of the controlled member, the mechanical distortion which will be developed in the driving equipment is sharply reduced compared with the conventional digital driving equipment, thereby leading to the realization of a smooth driving operation.

It is therefore a primary object of the present invention to provide a novel polyphase selection digital driving system for digitally controlling the movement of a controlled member wherein the application of command pulses to the driving means for the controlled member are inhibited whenever the droop falls outside of the limits of a prescribed range.

Another object of the present invention is to provide novel polyphase selection digital driving means for accurately controlling the movement of a controlled member wherein the controlled member is interlocked with driving means which is further mechanically coupled to polyphase detection means for generating a plurality of phase signals arranged in predetermined phase relationships in which one of the phase signals is selected by the phase selector under control of the command pulses and further comprising means for selecting one of the polyphase signals having a predetermined phase relationship to the phase signal operating the driving means at any given instant. Which signal is compared against a reference level to inhibit application of command pulses to the phase selector as soon as the droop falls outside of the prescribed limits.

These as well as other objects of the present invention will become apparent when reading the accompanying descriptions and drawings in which:

FIG. 1 is a block diagram showing a polyphase selection digital driving system designed in accordance with the principles of the present invention.

Figure 2:
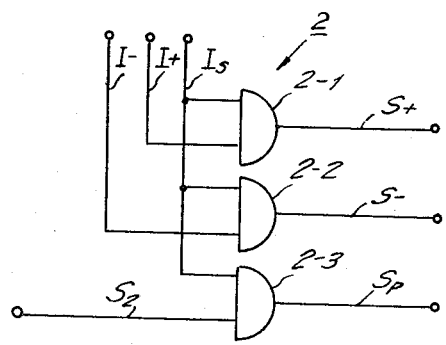
FIG. 2 is a block diagram showing the logical gating circuits of the distributor component of the polyphase selection digital driving system of FIG. 1 in greater detail.
Figure 3A:
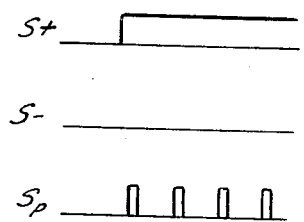
Figure 3B:
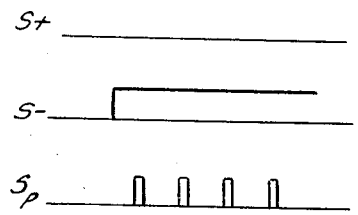

FIGS. 3a and 3b each show waveforms useful in describing the relationship between the elemental signals making up the distribution signals generated by the distributor of FIG. 2.

Figure 1:
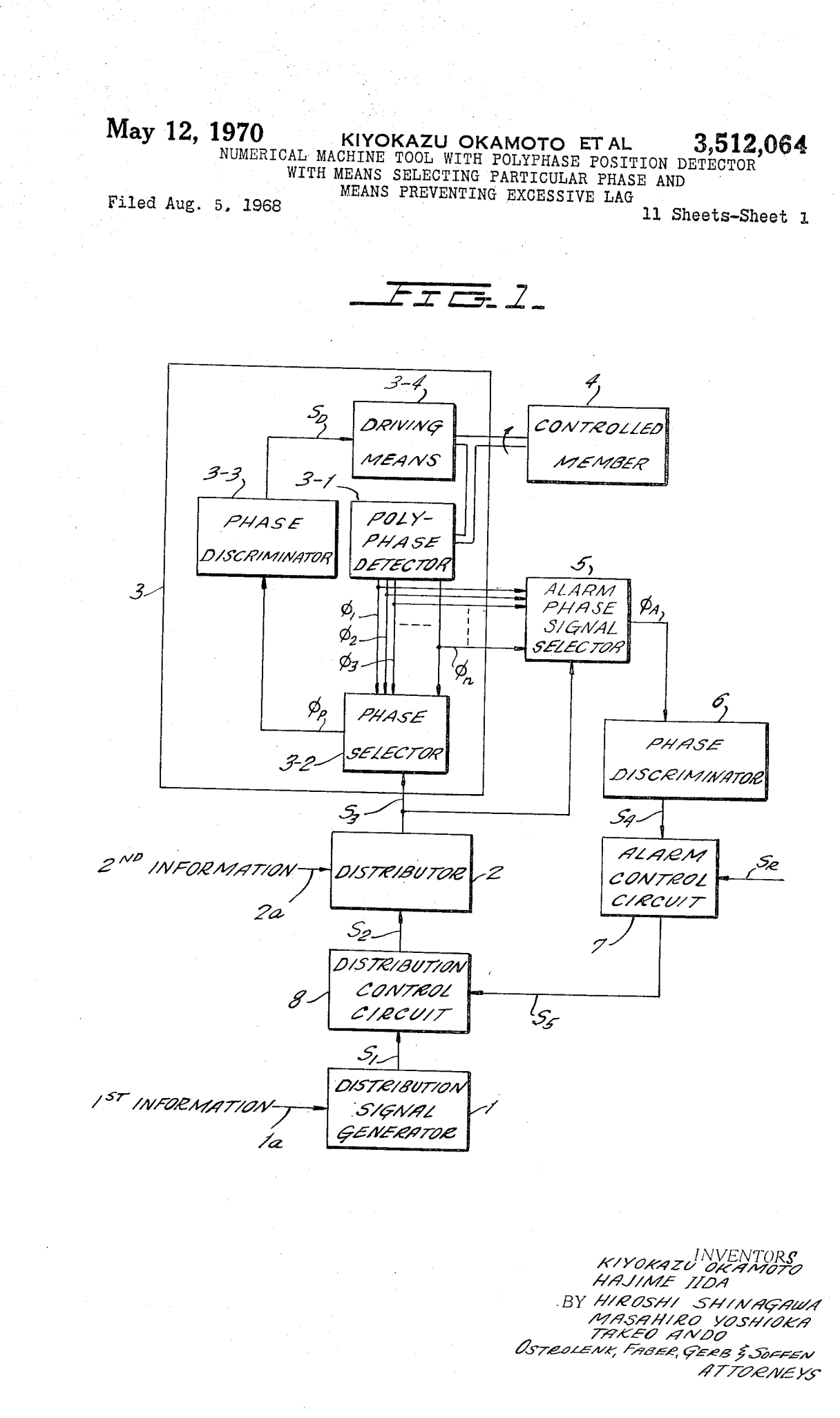
Figure 4:
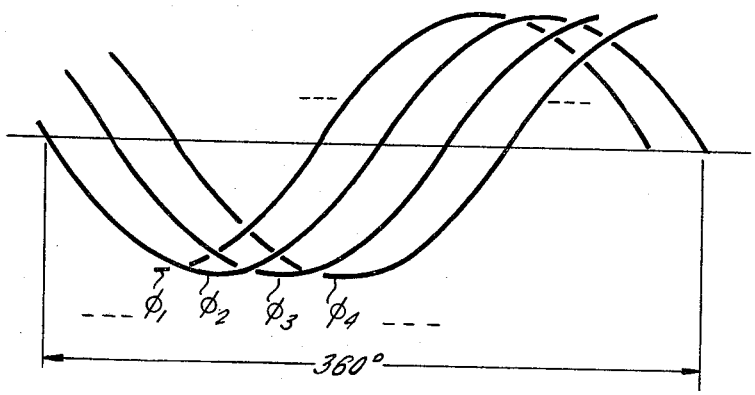

FIG. 4 shows a plurality of waveforms which represent the output characteristics of a polyphase detector which in turn forms a part of the driving equipment employed as a component in the polyphase selection digital driving system of FIG. 1.

Figure 5:
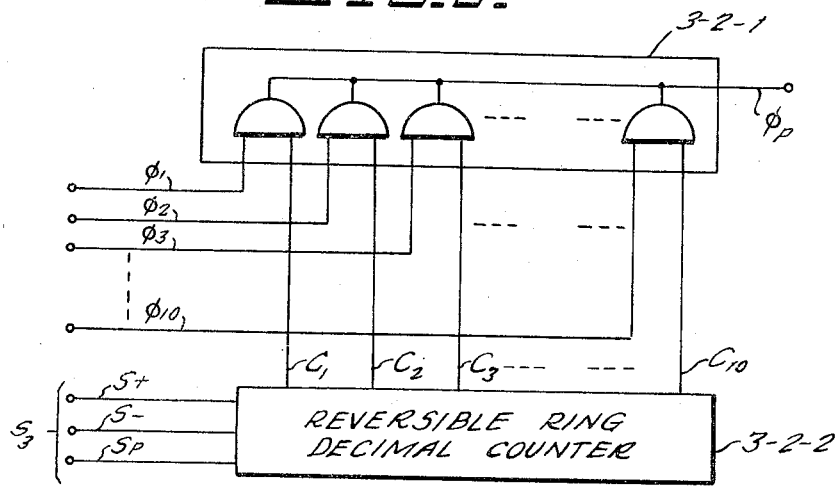

FIG. 5 is a block diagram showing one preferred embodiment of a positioning phase selector which forms a part of the driving equipment of the system of FIG. 1 in greater detail.

Figure 6A:
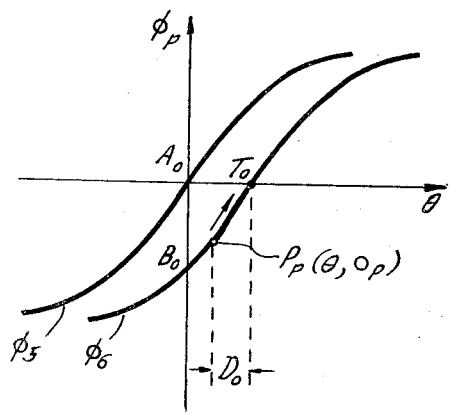
Figure 6C:
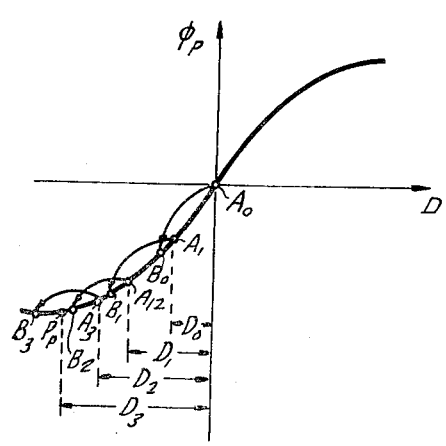
Figure 6B:
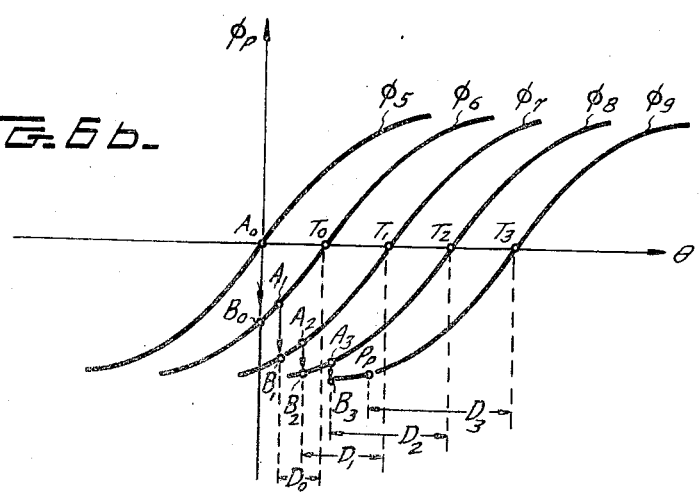

FIGS. 6a through 6c show a plurality of waveforms useful in explaining the operation of the driving equipment in the system of FIG. 1.

Figure 7:
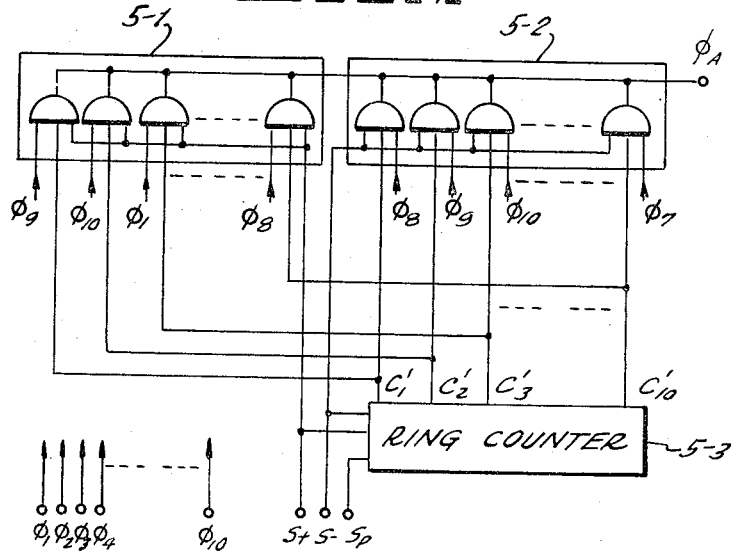
Figure 8:
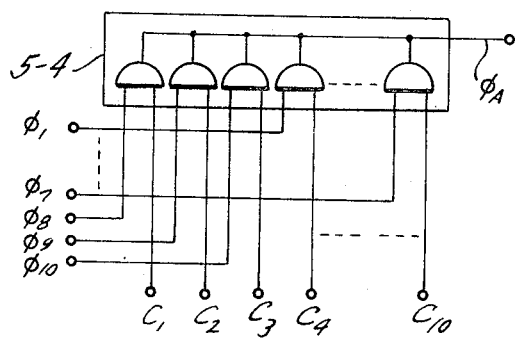

FIGS. 7 and 8 are detailed views of two alternative embodiments which may be employed as the phase alarm signal generating means of FIG. 1, showing the embodiments in block diagram form.

Figure 9:
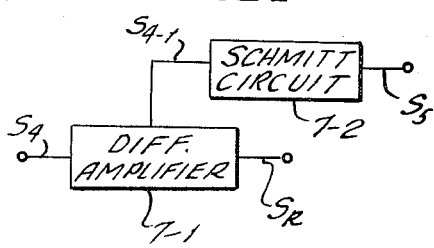

FIG. 9 is a block diagram showing in greater detail one embodiment of the alarm control circuit of FIG. 1.

Figure 10:
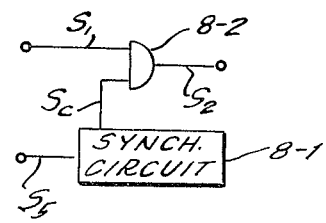

FIG. 10 is a block diagram showing in greater detail one embodiment of the command pulse inhibiting circuit of FIG. 1.

FIGS. 11a through 11c and FIGS. 12a through 12c show waveforms useful in describing the operation of the system of FIG. 1 when the driving equipment incorporates the alarm phase selector circuit of FIG. 7.

Figure 13A:
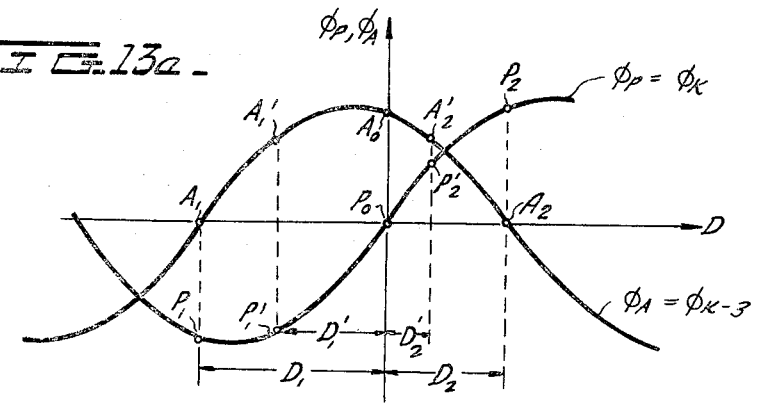
Figure 13B:
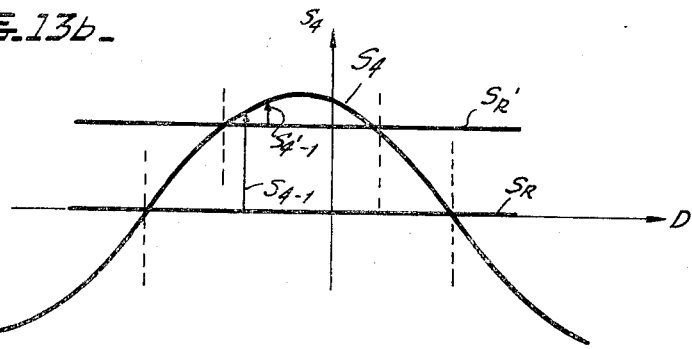
Figure 13C:
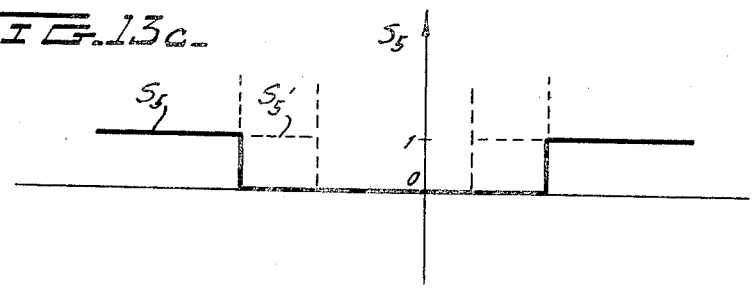

FIGS. 13a through 13c show a plurality of waveforms useful in illustrating the operation of the system of FIG. 1 for the case when the phase alarm detection circuit of FIG. 8 is employed in the system.

Figure 14:
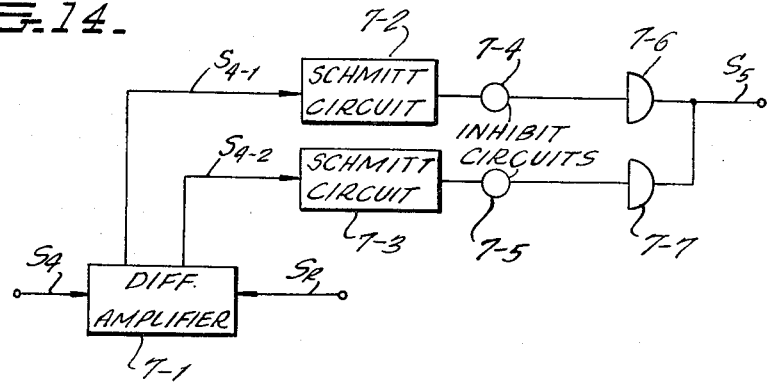

FIG. 14 is a block diagram showing another alternative embodiment which may replace the alarm control circuit of FIG. 9 in the system of FIG. 1.

Figure 15A:
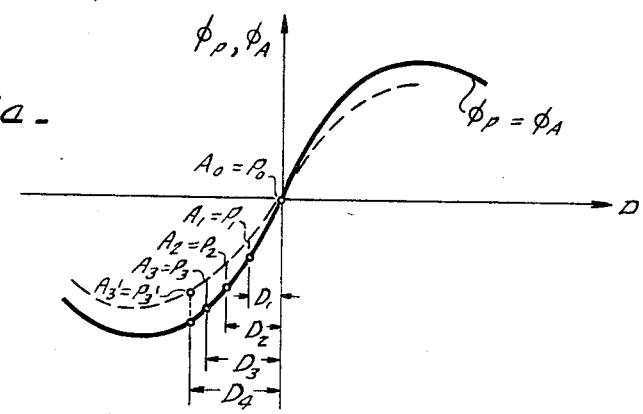
Figure 15B:
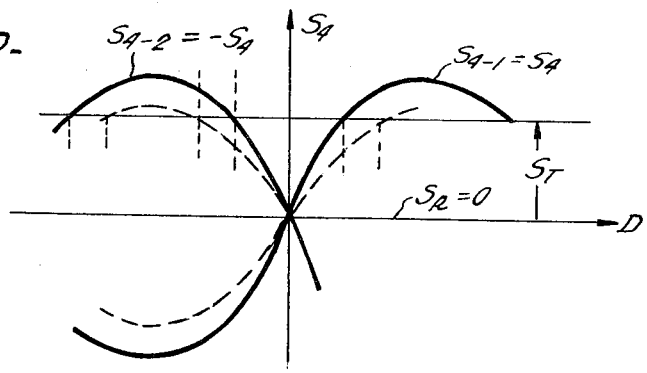
Figure 15C:
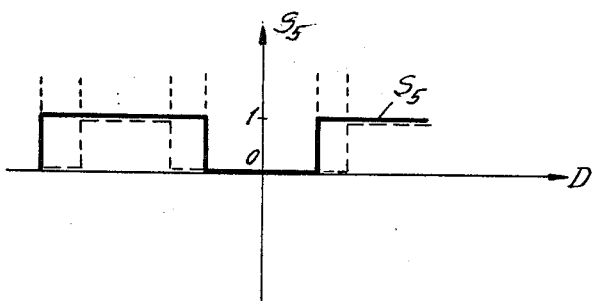

FIGS. 15a through 15c show a plurality of waveforms useful in illustrating the operation of the system of FIG. 1 when the embodiment of FIG. 14 is employed as the alarm control circuit of the system.

Figure 16:
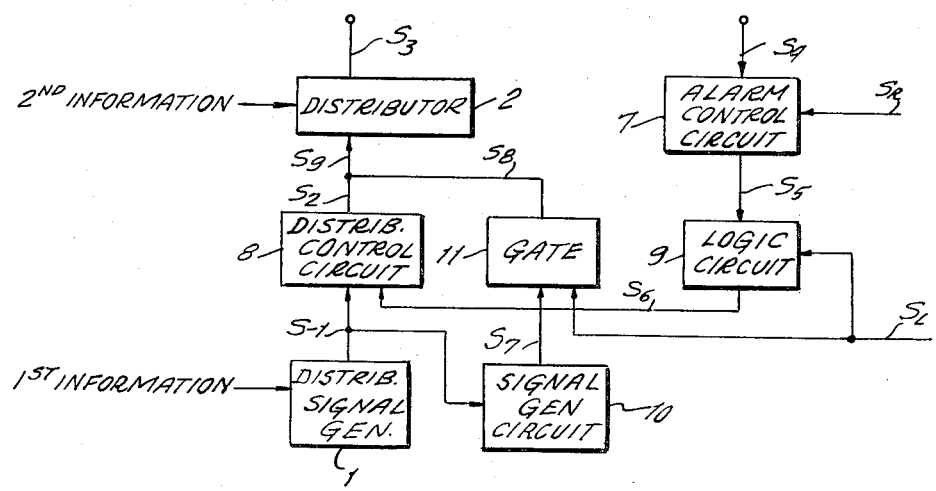

FIG. 16 is a block diagram showing a portion of the system of FIG. 1 which is modified for the purpose of increasing the effectiveness of the present invention in those cases in which the driving equipment is decelerated.

Figure 17A:
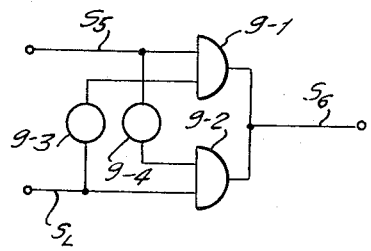
Figure 17B:
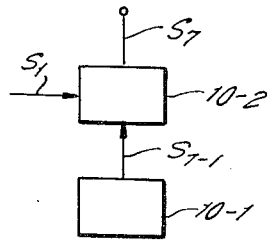
Figure 17C:
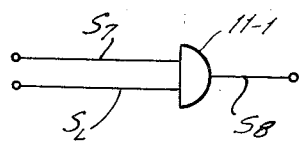

FIGS. 17a through 17c are block diagrams showing respective portions of the modified arrangement of FIG. 16 in greater detail.

Figure 17D:
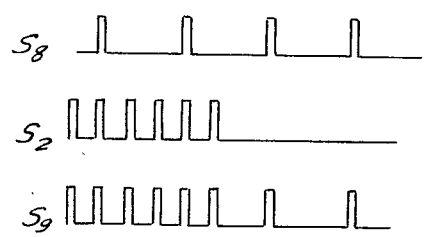

FIG. 17d shows a plurality of waveforms useful in understanding the relation between certain signals of the modified structure of FIG. 16.

Figure 18A:
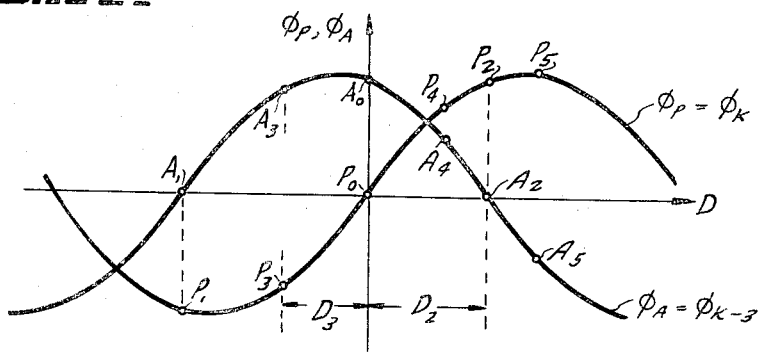
Figure 18B:
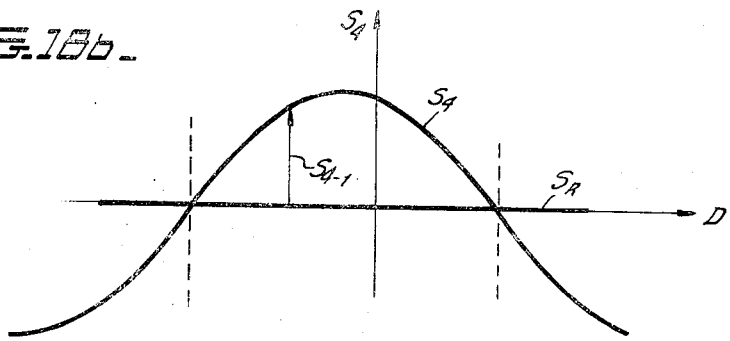
Figure 18C:
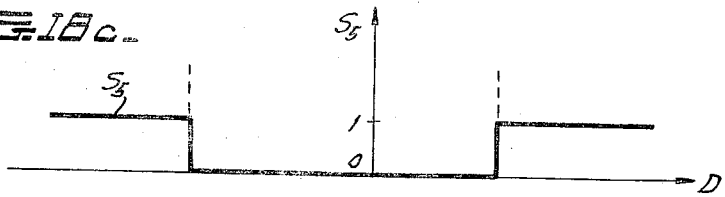

FIGS. 18a through 18c show a plurality of waveforms useful in explaining the operation of the system of FIG. 1 when modified to include the additional structural components of FIG. 16.

Figure 19:
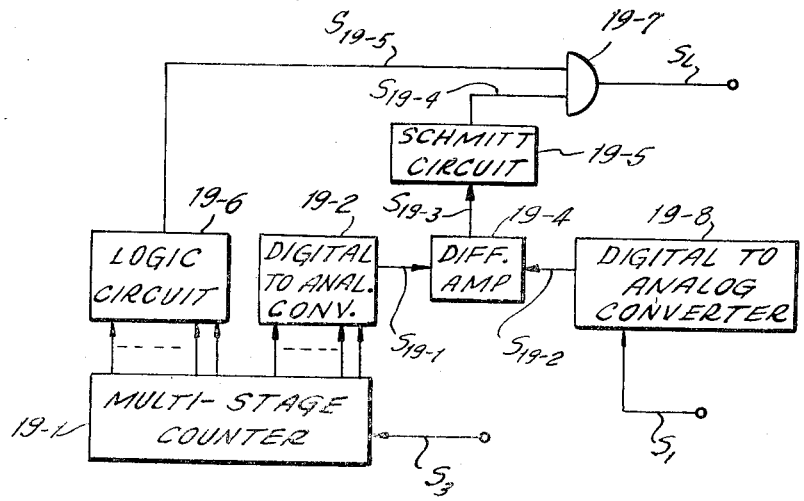

FIG. 19 is a block diagram showing, in greater detail, the means for generating a decelerating command signal $S_L$ used in the modified circuitry of FIG. 16.

FIGS. 20a through 20d show a plurality of waveforms useful in describing the signals generated by and the operation of the circuitry of FIG. 19.

FIG. 1 shows a polyphase selection digital driving system embodying the principles of the present invention in which the devices designated by numerals 1, 2 and 3 constitute elements normally found in conventional positioning phase selection digital driving systems and in which the devices 5, 6, 7 and 8 constitute the improvements incorporated in the novel polyphase selection digital driving system of the present invention.

A consideration of the positioning phase selection digital driving equipment will first be given. The distribution command device 1 generates a distribution command signal $S_1$ with every timed interval of 1/(command feed rate), i.e. inversely proportional to the command feed rate, under control of the first information applied at its input terminal 1a which specifies the command feed rate for the controlled member 4. A distribution signal control circuit 8, which will be more fully described hereinbelow, receives the distribution command signal $S_1$ at one input terminal and also receives a controlling signal $S_5$ which will be described in more detail hereinbelow, for the purpose of generating a controlled distribution command signal $S_2$.

A distributor circuit 2 receives at a first input terminal 2a second information which prescribes the method of distribution of the command signal applied as a second input to circuit 2 which thereby generates a distribution signal $S_3$ indicating a one-step variation and a direction of a commanded position of the controlled member 4, which signals are appled to the driving equipment 3, to be explained hereinbelow. Distributor 2 may, for example, be a well known digital interpolator comprising a digital differential analyzer which is conventionally used in numeral control devices and further comprises, as the case may be, well known AND gates 2-1, 2—2 and 2-3 such as are shown in FIG. 2. The second information, which may be comprised of a signal I+ or I— specifying the direction of variation of the commanded position of the controlled member 4 and a distribution start signal $I_S$, is applied to the AND gates of FIG. 2 in the manner shown. Output signals comprised of either element signals S+ or S— are generated at AND gates 2-1 or 2—2, respectively, to indicate the direction of distribution, while a signal $S_p$ is generated by AND gate 2-3 which indicates a one-step variation of commanded position of the controlled member whenever AND gate 2-3 receives the controlled distribution demand signal $S_2$ concurrently with the start signal $I_S$. Thus, the distribution signal $S_3$ is actually comprised of the element signals S+ and $S_S$, or S— and $S_p$. The time relationships of these signals are respectively illustrated in FIGS. 3a and 3b.

The driving equipment 3 of FIG. 1 is comprised of a polyphase detector 3–1 which generates polyphase detection signals $\phi_1-\phi_n$ which signals have prescribed phase differences as compared with the actual position of the controlled member 4. A positioning phase selector 3–2 receives all of the polyphase detection signals $\phi_1-\phi_n$ as first inputs and receives the distribution signal $S_3$ as a second input for the purpose of selecting each of the phase signals $\phi_1-\phi_n$ in sequential fashion phase by phase as each signal $S_3$ is received. The selected phase detection signal $\phi_p$ is applied to phase discriminator circuit 3—3 which is comprised of a phase discriminator and power amplifier for discriminating the phase of the selected positioning phase signal, amplifying the signal and producing a driving signal $S_D$ which, in turn, is applied to a driving means 3–4 interlocked with the controlled member 4 in order to operate or otherwise move the controlled member so that the difference between the position of the controlled member and the driving signal comes very close to 0. Thus, the arrangement of FIG. 1 sets up a closed loop with respect to the signals $\phi_1-\phi_n$, $\phi_p$ and $S_D$.

One preferred embodiment of the driving equipment 3 and its mode of operation will now be considered in detail. A controlled member 4 may, for example, be a table, saddle or knee of a machine tool. The driving member 3–4 which drives the controlled member 4 may, for example, be an electric motor or an oil pressure motor. The polyphase detector 3–1 which may, for example, be mechanically coupled through gear means to the rotating output shaft of the driving member 3–4 may be comprised of a bipole 10-phase polyphase synchrodetector incorporating a bipolar rotor and a 10-phase stator, in which a specified exciting signal is fed to the rotor windings of the polyphase detector 3–1. 10-phase detection signals $\phi_1-\phi_{10}$—which have been amplitude-modulated according to the rotary angle $\theta$ of the rotor and have a period of $360/2/2=360°$—are induced in the stator windings. FIG. 4 shows one full cycle of selected ones of the waveforms which represent the voltage envelopes of detection signals $\phi_1-\phi_{10}$ in which the voltage magnitude and waveforms are plotted along the ordinate and in which the rotary angle $\theta$ between phases is plotted along the abscissa. Obviously, all 10 phases of the multiphase signal are arranged in substantially similar fashion. The remaining signals have been omitted for purposes of simplicity.

The positioning phase selector 3–2 of FIG. 1 is shown in greater detail in FIG. 5 and is comprised of an AND gate group 3–2–1 employed for the purpose of selecting one of the phase detection signals $\phi_1-\phi_{10}$ and is further comprised of a reversible decimal ring counter 3–2–2 which generates gating signals $C_1$-$C_{10}$ for opening any one of the AND gates among the AND gate group 3-2-1 while leaving all the remaining AND gates closed.

For purposes of understanding the operation of the phase selector, let it be assumed that the element signal S+ or S— of the distribution signal $S_3$ is employed to represent a signal commanding a normal or a reverse direction operation, respectively, of the ring counter 3-2-2 and that the detection signals $\phi_1$-$\phi_{10}$ are each applied to one input of an associated AND gate in group 3-2-1 for selection thereof, in a phase-by-phase sequential manner by changing the state of ring counter 3-2-2 a unit amount every time the element signal $S_p$ arrives. For example, if the gate signal $C_5$ is in a state of logical 1, and the remaining gate signals are in a state of logical 0, the AND-gate for the detection signal $\phi_5$ is open while the remaining AND gates are closed. This opened AND gate applies its output signal to a common bus which at this time yields phase signal $\phi_5$ as its selected positioning phase signal $\phi_p$. When the next distribution signal $S_3$ arrives, assuming the element signal to be S+, then counter 3-2-2 is advanced in the forward state causing gate signal $C_6$ to become logical 1 while the remaining gate signals are at logical 0. Conversely, if the element signal is S— then gate signal $C_4$ will become logical 1 while the remaining gates are at logical 0. Thus the positioning phase signal $\phi_p$ becomes $\phi_p=\phi_6$ or $\phi_p=\phi_4$.

The phase discriminator and power amplifier circuit 3—3 of FIG. 1 receives the positioning phase signal $\phi_p$ at its input and generates the driving signal $S_D$ which is generated after phase discrimination and amplification. The signal $S_D$ is applied to the input of driving means 3-4. The magnitude of the driving signal $S_D$ is dependent upon the magnitude of the positioning phase signal $\phi_p$ applied to its input. The driving means 3-4, upon receipt of driving signal $S_D$, rotates its own output shaft in order to reduce the magnitude of driving signal $S_D$ to 0 and thereby moves the controlled member 4 which is mechanically coupled with its output shaft by gear means, for example.

The foregoing operation will now be explained in conjunction with the waveforms shown in FIGS. 6a–6c. Let it be assumed that the positioning phase signal $\phi_5$ has been selected as shown in FIG. 6a. When an operating point $P_p(\theta,\phi_p)$ represented with coordinates $\theta,\phi_p$ is at a point $A_0$ ($\phi_p=0$ at this time) on the curve $\phi_p=\phi_5$ at which the driving means 3-4 no longer rotates its output shaft and further assuming that the distribution signal $S_3$ consisting of element signal S+ and $S_p$, it is expected that the positioning phase selector 3-2 then will operate so that the detection signal $\phi_6$ is selected such that $\phi_p=\phi_6$ whereby the point $P_p$ moves to a point $B_0$ on the curve $\phi_p=\phi_6$, and the driving signal $S_D$ corresponding to the positioning phase signal $\phi_p$ is applied to driving means 3-4. The driving means 3-4 rotates its output shaft so as to reduce nearly to 0 the value of the driving signal $S_D$, or, in other words, to make the point $P_p$ move along curve $\phi_p=\phi_6$ and in the direction of the arrow from the point $B_0$ to a point $T_0$ where $\phi=0$. Since the point $T_0$ corresponds to the commanded position toward which the controlled member 4 is moving, and the point $P_p$ corresponds to the actual position of controlled member 4, the droop in this case is represented by the quantity $D_0$. The distributor signal $S_3$ is applied anew to the positioning phase selector 3-2. The point $P_p$ will be stabilized when it reaches the point $T_0$ unless the positioning phase signal $\phi_p=\phi_7$. However, before the point $P_p$ reaches the point $P_0$, the next occurring distribution signal $S_3$ is fed to selector 3-2 and is successively applied to selector 3-2 causing the positioning phase signal $\phi_p$ to be varied to $\phi_p=\phi_6$, $\phi_7$, $\phi_8$, $\phi_9$ . . . in a successive manner as shown best in FIG. 6b causing the positioning of point $P_p$ to be changing in such a manner as to follow the path $$A_0 \to B_0 \to A_1 \to B_1 \to A_2 \to B_2 \to A_3 \to B_3 \to P_p$$

Each difference (i.e. droop) between the position of a point $T_k$ ($k$: mod 10) which is a commanded position of the controlled member 4 corresponding to the positioning phase signal $\phi_{k+6}$ and the position of the point $P_p$ is represented by the value $D_0$, $D_1$ or $D_2$ when the point $P_p$ is at $A_1$, $A_2$ and $A_3$ respectively, and is represented by the quantity $D_3$ when $\phi_p=\phi_9$. The sum and substance of FIG. 6b can be represented in the simplified manner shown in FIG. 6c assuming the positioning phase signal $\phi_p$ as a reference and utilizing this waveform which shows the relation of the positioning phase signal $\phi_p$ to the droop D. All the symbols shown in FIG. 6c correspond to those shown in FIG. 6b. As a result of the repeated operations described with reference to FIGS. 6a–6c the droop is settled at a phase where a substantially balanced condition is achieved between a variation/time ratio of the point $T_k$—viz. and the current/time ratio of the distribution signal $S_3$ which is proportional to an occurrence/time ratio of the distribution command signal $S_1$—and the variation/time ratio (=actual feed rate of the controlled member 4) of the coordinate $\theta$ of the point $P_p$, for example, which settles at a locale in the vicinity of the point where $D=D_3$ shown in FIG. 6c. Considering the balanced condition from another viewpoint, it can be seen that the discrete variation in position of the controlled member progressively increases while the discrete variations in the driving signals can be seen to progressively decrease until a substantially balanced condition is reached between the two.

As was already explained, however, when the occurence/time ratio of the distribution command signal $S_1$ is considerably greater than the variation/time ratio of the coordinate $\theta$ of the point $P_p$, for instance, when the mass effect of the driving system is great upon abrupt acceleration, and when a big external force (such as a cutting resistance in a machine tool) is imposed abruptly upon the controlled member 4 in a direction opposite to that of the driving direction, the system is defective in that the point $P_p$ is not able to follow the point $P_k$ corresponding to the command position, and the mechanical distortion in the driving system is increased rapidly owing to the abrupt increase of torque generated in the driving means 3-4 in accordance with the value of droop.

A detailed explanation will now be given of one embodiment of the present invention and the manner in which it operates the polyphase selection digital driving equipment to yield a highly accurate follow-up and low mechanical distortion within the driving system owing to the employment of the new principles as explained in the objects of the present invention. The structure of the present invention is comprised of the positioning phase selection digital driving equipment including the devices 1, 2 and 3 as shown in FIG. 1 as well as the devices 5–8 all of which are set forth in detail hereinbelow.

The circuit 5 has a circuit structure similar to that of the positioning phase selector 3-2, and functions to select an alarm phase signal $\phi_A$ having as prescribed phase relationship to the positioning phase signal $\phi_p$ whenever the distribution signal $S_3$ is applied thereto. Circuit 5 will hereinafter be referred to as the alarm phase signal selection circuit. One example of the circuit structure of circuit 5 is shown in detail in FIG. 7 wherein the relation of $\phi_A=\phi_{k-2}$ or $\phi_{k-3}$ ($k$: mod 10) is maintained when $\phi_p=\phi_k$ (mod: 10). A ring counter similar to the reversible decimal ring counter 3-2-2 of FIG. 5 generates the gate signals $C'_1$-$C'_{10}$ which are developed in a manner corresponding to the gate signals $C_1$-$C_{10}$ of the ring counter of FIG. 5. For example, when $C_k$=logical 1 and another $C_j$=logical 0 ($j \neq k$, $j=1, 2 \ldots 10$), then $C'_k$=logical 1 and another $C'_j$=logical 0 ($j \neq k$, $j=1, 2 \ldots 10$). In addition, when the element signal S+ of the above-described distribution signal $S_3$ is applied, i.e. when the distribution direction is positive, the gate groups 5-1 is in an operated state and its operation corresponds to that of the gate group 3-2-1 shown in FIG. 5. From a consideration of FIGS. 5 and 7 it can be seen that the differences between the circuitry is that the gate signal $C_k$ and the signal $\phi_k$ are combined in the AND gate group 3-2-1 of FIG. 5, while the gate signal $C'_k$ and the signal $\phi_{k-2}$ ($k$: mod 10) are combined in the AND gate group 5-1 of FIG. 7. Thus when the direction of distribution is positive, if $\phi_A = \phi_{k-2}$ ($k$: mod 10), $\phi_p = \phi_k$. This is due to the fact that the gate signals and phase distribution signals combined in any one gate carry different subscripts so that the phase signals of $\phi_A$ generated at the output of the circuit of FIG. 7 is in a sense staggered or delayed by two phases behind the signal $\phi_p$ developed at the output of the circuit of FIG. 5. For example, at the time a signal $\phi_3$ appears at the output of AND gate group 3-2-1 a phase alarm selection signal $\phi_1$ is developed at the output of the AND gate groups 5-1 and 5-2. In a similar manner, when the element signal S— is applied to the circuitry, that is when the direction of distribution is negative, if $\phi_A = \phi_{k+7} = \phi_{k-3}$ ($C_k$: mod 10), $\phi_p = \phi_k$. From the above explanation it can be seen that, since the gate signal $C_k$ is equivalent to the gate signal $C'_k$ and that the signals are substantially identical in quality and function then the gate signals $C_k$ of the circuit 3-2-2 of FIG. 5 can be substituted for the ring counter 5-3 of FIG. 7 and the ring counter 5-3 can be eliminated.

Referring again to FIG. 1, if the gate signals $C_1$-$C_{10}$ are applied to the AND gate groups 5-1 and 5-2 from the ring counter 3-2-2 and the elements signals S+ and S— are applied to the appropriate AND gate groups 5-1 and 5-2 respectively, then the ring counter 5-3 can be completely eliminated and the need for supplying the signal $S_p$ can also be eliminated from the circuitry of FIG. 7.

FIG. 8 shows a simplified embodiment which may be substituted for the circuitry of FIG. 7. In the arrangement of FIG. 8 the circuitry 5 is comprised of only AND gate group 5-4. When FIG. 1 incorporates the circuitry of FIG. 7 only the elemental signals of $S_3$ the detection signals $\phi_1$-$\phi_{10}$ need be supplied to the first means 5 while in the case where the circuitry of FIG. 8 is utilized in the system of FIG. 1 only the gate signals $C_1$-$C_{10}$ and the phase detection signals $\phi_1$-$\phi_{10}$ need be applied to the circuitry of FIG. 8 and the elemental signals of distribution signal $S_3$ are eliminated.

In FIG. 8, the gate signal $C_k$ is combined with the signal $\phi_{k-3}$ ($k$: mod 10); accordingly, when the distribution signal $S_3$ is comprised of the element signals S+ and $S_p$, that is when the direction of distribution is positive, if $\phi_A = \phi_{k-3}$ ($k$: mod 10), $\phi_p = \phi_k$. Also, in the case where the direction of distribution is negative, if $\phi_A = \phi_{k-3}$ ($k$: mod 10), $\phi_p = \phi_k$. Thus, the same staggered or delayed relationship existing in the embodiment of FIG. 7 is present in the embodiment of FIG. 8 except that the staggered relationship is identical for both positive and negative direction of the distribution signal.

The alarm phase signal $\phi_A$ selected in the manner described above, is applied to phase discriminator circuit 6 which, in turn, is comprised of a conventional phase discriminator and power amplifier. The circuit 6, after phase discrimination and amplification of the signal $\phi_A$ generates an alarm signal $S_4$. The phase discriminator circuit 6 may be modified in the following manner:

The polyphase detector 3-1 was previously described as being an induction type detector such as, for example, of the synchro type. However, when the detection signals $\phi_1$-$\phi_{10}$ generated by the polyphase detector 3-1 are signals which do not need phase discrimination then the phase discriminator circuit 6 (as well as the phase discriminator circuit 3-3) may both be replaced by simple amplifier circuits. This modification is possible through the use of a polyphase detector 3-1 which is comprised of a stator having ten voltage generating elements of the Hall-effect type and having a dipole magnetic rotor. The Hall-effect voltage generating elements are supplied with signals having a prescribed D.C. voltage, thereby eliminating the need for phase discriminators and power amplifier circuits.

The output of the circuit 6 is applied to the alarm control circuit 7 which generates a distribution controlled signal $S_5$ when the magnitude of the alarm signal $S_4$ has a predetermined relationship with a specified reference signal $S_R$. The distribution control signal $S_5$ is applied to distribution controlled signal circuit 8 which receives the distribution command signal $S_1$ as an input signal and passes the controlled distribution command signal $S_2$ to distributor circuit 2 in a manner to be more fully described.

FIG. 9 is a block diagram showing one embodiment of the circuit of FIG. 7. As shown therein, a differential amplifier 7-1 receives the prescribed reference signal $S_R$ as the first input which opeartes as a level of reference operating point for the amplifier 7-1. The other input is the alarm signal $S_4$. Differential amplifier 7-1 operates to generate an output signal $S_{4-1}$ which has the same phase as the alarm signal $S_4$ and indicates the amplitude difference between the alarm signal $S_4$ and the reference signal $S_R$. The output signal $S_{4-1}$ is applied to the input of a Schmitt circuit 7-2 which generates a logical 0 output when the magnitude of the signal $S_{4-1}$ is greater than the level of the Schmitt circuit. Conversely, if the level of signal $S_{4-1}$ is less than the Schmitt level, the output signal $S_5$ is logical 1.

FIG. 10 shows one embodiment of the distribution controlled signal circuit 8 which is comprised of a synchronizing circuit 8-1 and an AND gate 8-2. The output signal $S_5$ of the Schmitt circuit 7-2 is applied to the input of synchronizing circuit 8-1 which generates an output signal $S_c$ which is logical 0 when the distribution controlled circuit $S_5$ is logical 1 to thereby close gate 8-2. As a result, gate 8-2 terminates the generation of controlled distribution command signals $S_2$. Conversely, when the distribution controlled signal $S_5$ is logical 0, the output signal $S_c$ of the circuit 8-1 is logical 1 opening gate 8-2. Each time the distribution command signal $S_1$ is applied to the appropriate input terminal of circuit 8, the controlled command $S_2$ will thereby appear at its output terminal. The circuit 8-1 is of a well-known type in which the state of signal $S_c$ is prevented from being switched between logical 0 and logical 1 when the distribution command signal $S_1$ is applied to the appropriate input terminal of circuit 8.

Figure 11A:
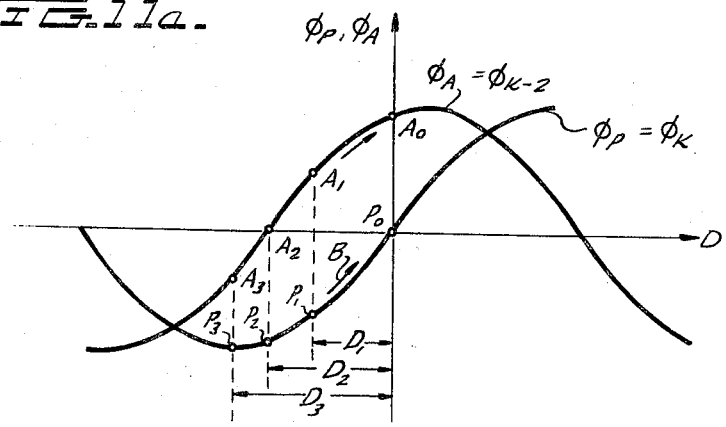
Figure 11B:
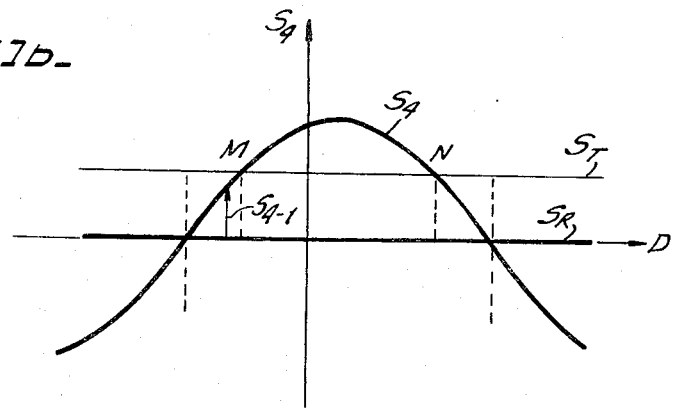
Figure 11C:
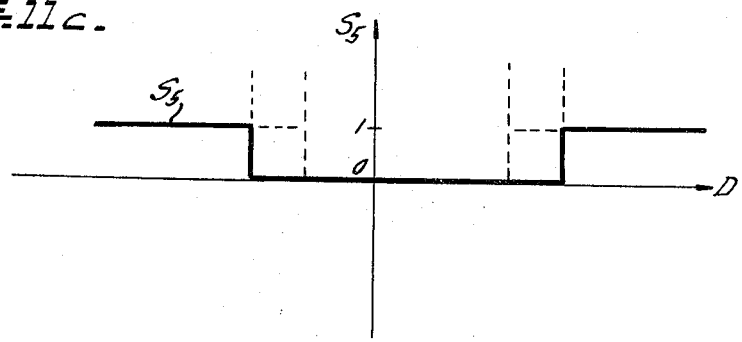

The operation of the system of FIG. 1 when employing the circuits of FIGS. 7, 9 and 10 will now be considered in conjunction with the waveforms of FIGS. 11a-11c for the case when the direction of distribution is positive. FIG. 11a shows the relation between the droop D and the alarm phase and positioning phase signals $\phi_A$ and $\phi_p$ respectively. FIG. 11b shows the relation between the alarm signal $S_4$ obtained by discriminating the phase of the alarm phase signal $\phi_A$ as well as the prescribed reference signal $S_R$. FIG. 11c shows the relationship of the distribution controlled signal $S_5$ relative to the polarity of the signal $S_{4-1}$. FIG. 11a illustrates the relation between the droop and the operating point $P_p$ which lies along a curve representing the selected positioning phase signal $\phi_p$ ($=\phi_k$), and the relationship between the operating point $P_p$ and the alarm point $P_A$ which lies along a curve representing the alarm phase signal $\phi_A$ ($=\phi_{k-2}$). When the points $P_p$ and $P_A$ are situated at the points $P_0$ (=stable point) and $A_0$ respectively, the droop D is 0. FIG. 11b shows the relation among the signals $S_4$, $S_R$ and $S_{4-1}$. As an example, if the value of the reference signal is selected to be 0 and if the Schmitt level of the Schmitt circuit (circuit 7-2 of FIG. 9) which receives the signal $S_{4-1}$ is selected to be 0, then the signal $S_{4-1}$ for the point $A_0$ is positive. Therefore, in FIG. 9, the distribution controlled signal $S_5$ which is the output of circuit 7-2 is in the state of logical 0 as is clearly shown in FIG. 11c.

In FIG. 1, when the distribution signal $S_3$ is applied to the driving equipment in a positive direction from distributor 2 at a higher speed than that in which the driving equipment rotates, the droop D becomes greater than 0 and the operating point $P_p$ moves from the point $P_0$ as shown in FIG. 11a and advances to the points $$P_1 \rightarrow P_2 \rightarrow P_3$$

in the extreme case, with each droop corresponding to said points increasing to $D_1 \rightarrow D_2 \rightarrow D_3$. However, the alarm signal $S_4$ changes sign or polarity as shown in FIG. 11b after passing through the point $P_2$ which is defined as the intersection between the reference level $S_R$ and the alarm phase signal $S_4$. Thus, as soon as the point $P_p$ moves past the point $P_2$ toward the point $P_3$, the state of the distribution control signal $S_5$ abruptly changes from logical 0 to logical 1 as shown in FIG. 11c.

When the distribution control signal $S_5$ is logical 1, the controlled distribution command signal $S_2$ is terminated by the circuitry of FIG. 10 in spite of the fact that the distribution command signal $S_1$ is being generated. Accordingly, since the distribution signal $S_3$ is no longer generated, the droop is not increased. The point $P_p$ of FIG. 11a then proceeds to a stable point $P_0$ moving in the direction shown by arrow B as a result of the operation of the driving equipment 3 of FIG. 1 which has been explained with respect to FIG. 6c. Corresponding with this, the point $P_A$ proceeds to the point $A_0$ in the direction shown by arrow B'. When the point $P_p$ moves closer to the point $P_0$ than the point $P_2$, the droop is decreased and becomes smaller than the droop $D_2$. At this time, the signal $S_{4-1}$ varies abruptly from negative to positive polarity as shown in FIG. 11b and the control signal $S_5$ correspondingly changes abruptly to logical 0 as shown in FIG. 11c. Continuing with the operation of FIG. 1, the signals $S_2$ and $S_3$ are again correspondingly generated with the distribution command signal $S_1$ and the droop is again increased. However, if the droop is increased it becomes larger than the value $D_2$, the distribution signal $S_3$ is again terminated as was described hereinabove and the driving equipment 3 again operates so as to reduce the droop. While the above states are repeated the kinetic energy which is stored in the driving system increases gradually and the mass effect of the driving system is reduced. Thus, the changing speed of the above-described rotary angle $\theta$ becomes nearly balanced with an occurrence/time ratio of the distribution signal $S_3$, and the droop falls within a range which is smaller than the value $D_2$, which range is defined as that in which the control signal $S_5$ is equal to logical 0.

The significant factors of the above explanation may be summarized as follows:

(1) As long as the alarm signal $S_4$ which is based on the alarm phase signal $\phi_A$—which has a prescribed phase difference relative to the positioning phase signal $\phi_p$—does not hold a prescribed relation to the reference signal $S_R$, the droop can only be decreased. Therefore, the droop is held within the vicinity of the specified value $D_2$.

(2) Even when the driving system is accelerated, that is, even when the mass effect of the driving system becomes significant, the value of droop is maintained substantially within the vicinity of the value $D_2$. Hence the value of the driving signal $S_D$ corresponding to the point $P_p(\theta,\phi_p)$ (FIG. 1) which signal is fed to the driving system, is nearly constant.

With regard to observation 1, it can be seen that high accuracy follow-up characteristics are attained according to the present invention. Similarly, from a consideration of observation 2, the magnitude of mechanical distortion generated in the driving system is largely averaged. In addition thereto, if the reference signal $S_R$ and the Schmitt level are not assumed to be 0, for example, if the levels are selected so that $S_R=0$ and the Schmitt level=$S_T$ (see FIG. 11b), then the width of the logical 0 range of distribution control signal $S_5$ becomes narrow (being reduced to the distance between dotted lines M and N. The same narrowing holds true even when $S_R=S_T$ and the Schmitt level equals 0.

Figure 12A:
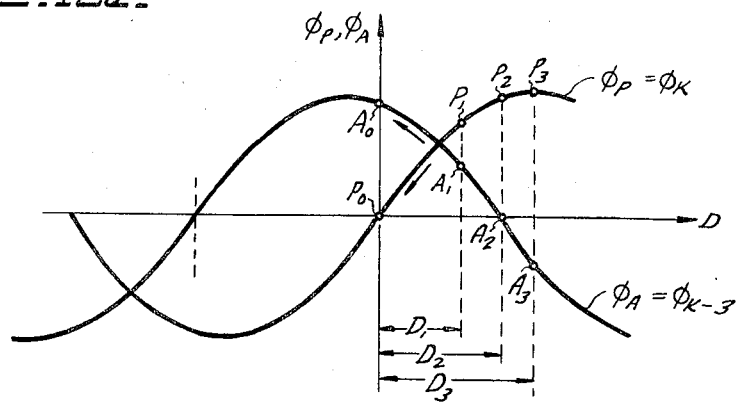
Figure 12B:
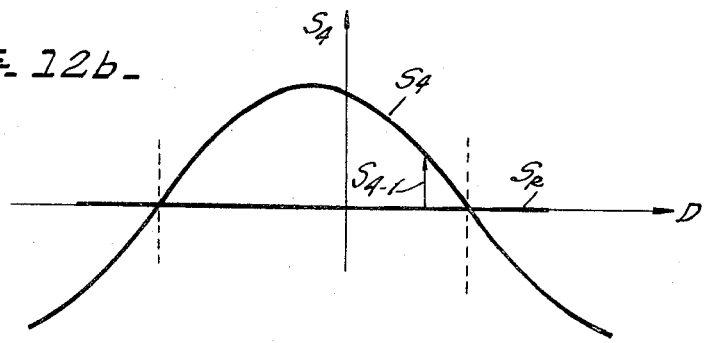
Figure 12C:
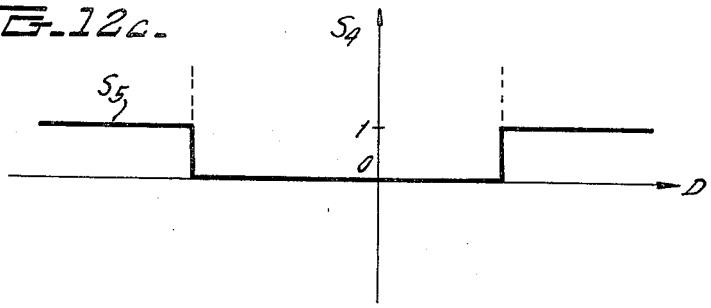

The operation of the system of FIG. 1 employing the embodiments of FIGS. 7, 9 and 10 will now be considered for the case in which the distribution is in a negative direction as best exemplified by the waveforms of FIGS. 12a–12c which correspond to FIGS. 11a–11c, respectively. The difference in the waveforms between the negative and positive directions are such that when the positioning phase signal $\phi_p=\phi_k$ then the alarm phase signal $\phi_A$ is selected to be $\phi_A=\phi_{k-2}$ for the positive direction, while $\phi_A=\phi_{k-3}$ for the negative direction. As a result, if the value of the reference signal $S_R$ is selected to be 0, as shown in FIG. 12b (in a manner similar to that shown in FIG. 11b) and if the Schmitt level is designed to be 0, the signal $S_{4-1}$ which has the same phase as signal $\phi_A=\phi_{k-3}$ is applied to the Schmitt circuit 7–2 of FIG. 9. The operation of the system of FIG. 1 for negative direction signals is similar to the case already described where the distribution direction was positive and the droop is caused to fall within the range of nearly $D_2$ in the worst case as is shown in FIG. 12a. This is due to the fact that as the point $P_A$ moves beyond the point $A_2$ toward the point $A_3$ the signal $S_{4-1}$ changes polarity from positive to negative causing the signal $S_5$ to abruptly become logical 1 thereby terminating the distribution signals $S_3$ until the droop is reduced to a value no greater than $D_2$.

The operation of the system of FIG. 1, when employing the embodiments of FIGS. 8, 9 and 10, will now be explained:

When the direction of distribution is positive, as shown in FIGS. 7 and 11, the alarm phase signal $\phi_A$ is selected to be $\phi_{k-2}$ when the positioning phase signal $\phi_p$ is=$\phi_k$. Conversely, when the direction of distribution is negative as shown in FIGS. 7 and 12, the alarm phase signal $\phi_A$ is selected to be $\phi_{k-3}$ when the positioning phase signal $\phi_p=\phi_k$. As a result, regardless of whether the droop is positive or negative in the distribution direction, both values of the droop fall within the small range of about $D_2$ in the worst case. In order to make the droop, when the distribution direction is positive, equal to the droop when the distribution direction is negative and in order to employ the simplified structure of FIG. 8 as a substitute for the circuitry of FIG. 7 it is preferred that the selection of the alarm phase signal $\phi_A$ be as close as possible to 90° away from the phase of the positioning phase signal $\phi_p$. For example, when the output of the above-described detector is comprised of 10 phases; since $$(360°/10) \times 2 - 90° = -18°$$

and $(360°/10) \times 3 - 90° = 18°$, it is preferred that the alarm phase signal $\phi_A$ be selected which is $$90° + 18° = 108°$$

or $90° - 18° = 72°$ for the above-described phase difference or, in other words to select $\phi_A=\phi_{k-3}$ or $\phi_A=\phi_{k-2}$ when $\phi_p=\phi_k$.

An explanation will now be given for the system of FIG. 1 employing the circuitry of FIG. 8 in which the alarm phase signal $\phi_A$ is selected to be $\phi_{k-3}$. FIGS. 13a–13c show waveforms similar to those of FIGS. 12a–12c, respectively, previously described. FIG. 13a shows the relation between the operating point $P_p$ which is on the curve representing the selected positioning phase signal $\phi_p(=\phi_k)$, and the droop D, as well as the relation between the alarm point $P_A$ which is on the curve representing the alarm phase signal $\phi_A(=\phi_{k-3})$ and the droop D. As was previously described, when the points $P_p$ and $P_A$ are situated at the points $P_0(=$stable point$)$ and $A_0$ respectively, then the droop is 0. FIG. 13b shows the relationship among the signals $S_4$, $S_R$ and $S_{4-1}$ wherein the value of the reference signal $S_R$ is selected to be 0 and the Schmitt level of the Schmitt circuit 7–2, which receives signal $S_{4-1}$ as an input has a 0 level. FIG. 13c exhibits the relation between the droop D and the distribution control signal $S_5$ generated by the Schmitt circuit. In the same manner as was previously described with regard to FIGS. 11a–11c and 12a–12c the droop does not grow larger than the value $D_1$ when the distribution direction is positive and the droop does not grow larger than the value $D_2$ when the distribution direction is negative. In the example given in FIGS. 13a–13c since $D_1 > D_2$ it can be seen that the droop, regardless of the direction of distribution, will always be equal to or less than $D_1$.

If the value of the reference signal $S_R$ is selected to be $S'_R$ the droop is respectively changed to $D'_1$ in the positive direction and $D'_2$ in the negative direction thereby indicating that the droop can be reduced to be no more than a maximum value $D_1'$ which is less than the maximum possible droop $D_1$ when using the reference signal level $S_R$. Thus by selecting the reference signal $S_R$ in the above manner the maximum droop is readily specified.

An explanation will now be given of one embodiment of the present invention in which the phase difference between the positioning phase signal $\phi_p$ and the alarm phase signal $\phi_A$ is selected to be 0. Since $\phi_p = \phi_A$ it can be seen from FIG. 1 that the positioning phase signal $\phi_p$ obtained from the positioning phase selector 3–2 may be directly applied as the input to phase discriminator circuit 6 and the alarm phase signal selector circuit 5 may be completely eliminated. However, a modification of the circuit 7 should be provided, which modified structure is shown in FIG. 14. The components added to the structure of circuit 7 which was previously described with respect to FIG. 9 includes an additional Schmitt circuit 7–3 having the same performance characteristics as the Schmitt circuit 7–2 as well as the inclusion of inhibit circuits 7–4 and 7–5 which inhibit the logical state of the output signals of circuits 7–2 and 7–3 and furthermore addition of the gates 7–6 and 7–7 which yield the logical sum of the output signals of circuits 7–4 and 7–5.

The input side of circuit 7–3 is arranged so as to receive the one side output signal $S_{4-2}$ of differential amplifier 7–1 such that the signal $S_{4-2}$ is opposite in phase relative to the other side output signal $S_{4-1}$. The level of the reference signal $S_R$ is said to be 0 and the Schmitt levels of circuits 7–2 and 7–3 are said to be $S_T$ as shown in FIG. 15b.

FIGS. 15a–15c illustrate the relation between the droop and the operating point $P_p(\theta, \phi_p)$ and the alarm point $P_A(\theta, \phi_A)$ as well as the relationship of the signals $S_{4-1}$ and $S_{4-2}$ which correspond to the difference between the alarm signal $S_4$ and the reference $S_R$ and the Schmitt level $S_T$ which yield the distribution control signal $S_5$ as shown in FIG. 15c. FIGS. 15a–15c correspond respectively to FIGS. 11a–11c described in conjunction with the operation of the system of FIG. 1 when employing the embodiments of FIGS. 7, 9 and 10. Referring initially to FIG. 15a, when the droop is smaller than the value $D_2$, i.e. when the point $P_A$ is situated at the point $A_1$, the levels of the signals $S_{4-1}$ and $S_{4-2}$ are below the level $S_T$ as shown in FIG. 15b. Thus, the output signals of the circuits 7–2 and 7–3 of FIG. 14 are both in the state of logical 1. This results from the fact that the outputs of Schmitt circuits 7–2 and 7–3 are each logical 0 and that the inhibit circuits invert these logical states to logical 1. At this time the output signals of inhibit circuits 7–4 and 7–5 being both logical 0 develop an output signal at their OR-ed output terminals, which signal $S_5$ is 0 as is further shown in FIG. 15c.

Conversely, when the droop is larger than the value $D_2$, i.e. when the point $P_A$ shown in FIG. 15a is situated at the point $A_3$, the level of the signal $S_{4-2}$ is above the level $S_T$ so that the state of the output signal of the Schmitt circuit 7–3 of FIG. 14 becomes logical 0. Inversion of this state to logical 1 by inhibit circuit 7–5 enables gate 7–7 so as to generate a distribution control signal $S_5$ which is logical 1 as shown in FIG. 15c. Since the relation between the droop in the vicinity of the point $A_0$ and the state of the distribution control signal $S_5$ is the same both in FIGS. 11 and 15, it can be seen that the equipment of the system of FIG. 1 employing the circuit of FIG. 14 performs the same operation as that explained with reference to FIGS. 11a–11c. However, when the detection signals are irregular in nature which can be experienced in many situations, such that low level detection signals are selected is illustrated by the dotted line waveform of FIG. 15a, the corresponding distribution control signal $S_5$ may then be represented by the dotted line waveform of FIG. 15c. Under these circumstances the point $A_3$ corresponds to the point $A'_3$ and the droop $D_2$ then becomes the droop $D'_2$ as shown in FIG. 15a. Conversely, if a high level detection signal is selected, the droop $D'$ becomes smaller that that shown in FIG. 15a and, in the extreme case, becomes smaller than a value corresponding to a single step moving distance of the controlled member. When such a detection signal is selected, the distribution control signal $S_5$ would be generated immediately. If the high level detection signal continues to be generated, the distribution control signal $S_5$ will be generated every time a new detection signal is selected. As a result, the average value of the occurrence/time density of the controlled distribution command signal $S_2$ of FIG. 1 is remarkably lowered, leading to the drawback that the rise time of the driving system becomes considerably large. When the levels of the detection signals are more nearly uniform with prescribed values the embodiment of FIG. 1 employing the circuit of FIG. 14 will successfully accomplish the object of the present invention in the most effective manner.

The system of FIG. 1 and its effectiveness have been described for those situations in which the droop is maintained within prescribed limits during periods of acceleration of the controlled member. The subsequent figures of the application show modifications of the system of FIG. 1 which may be employed to achieve the above advantages in cases when the driving system is decelerated.

FIG. 16 shows the additional structure added to the system of FIG. 1 to achieve the distinct advantages during deceleration. Only those portions of the system of FIG. 1 have been reproduced in FIG. 16 which are necessary to show the interconnection of the added circuitry. Basically, the additional structure of FIG. 16 includes a logical circuit 9 which receives the distribution control signal $S_5$ as an input as well as receiving a decelerating command signal $S_L$ from an external source which is applied as a control signal for the purpose of generating a modified distribution control signal $S_6$. The added circuitry further includes a low speed distribution command signal generating circuit 10 which receives the distribution command signal $S_1$ as an input for generating a low speed distribution command signal $S_7$, which signal has an occurrence/time ratio corresponding to the feed rate of the controlled member 4 which is to be decelerated and whereby the signal $S_7$ is also synchronized with the distribution command signal $S_1$. A gate circuit 11 is also provided for generating a controlled low speed distribution command signal $S_8$ by utilizing the low speed distribution command signal $S_7$ as an input signal and the decelerating command signal $S_L$ as a control signal. The modified distribution control signal $S_6$ is applied to the distribution control circuit 8 in place of the signal $S_5$ while the output of circuit 11 is connected to the output line of distribution control circuit 8 to produce a resultant signal $S_9$ which is the logical sum of the control distribution command signal $S_2$ and the controlled low speed distribution command signal $S_8$ which is then supplied in place of the controlled distribution command signal $S_2$ to distributor circuit 2.

FIG. 17a shows a detailed block diagram of the logic circuit 9 of FIG. 16 which is comprised of AND gates 9–1 and 9–2 and inhibit circuits 9–3 and 9–4 for the purpose of generating the modified distribution control signal $S_6$ which is represented by the logical Equation 1 and Table 1 set forth hereinbelow, employing the distribution control signal $S_5$ and the decelerating command signal $S_L$ as inputs:

$$S_6 = \overline{S_L} \cdot S_5 + \overline{S_L} \cdot S_5 \quad (1)$$

TABLE 1 (LOGICAL STATE OF SIGNAL $S^6$)

|  | $S_5=1$ | $\overline{S_5}=0$ |
| --- | --- | --- |
| $S_L=1$ | 0 | 1 |
| $\overline{S_L}=0$ | 1 | 0 |

FIG. 17b shows in further detail the circuitry of circuit 10 shown in FIG. 16 which is comprised of a conventional blocking oscillator 10-1 and a conventional synchronizing circuit 10-2. Circuit 10-1 generates an output signal $S_{7-1}$ having an occurrence/time ratio corresponding to the feed rate of the controlled member which is decelerated. Circuit 10-2 which receives signal $S_{7-1}$ as an input, generates the low speed distribution command signal $S_7$ so as to make both the generating times of the signal $S_{7-1}$ and the distribution command signal $S_1$ coincide with each other.

FIG. 17c shows one embodiment of the gate circuit 11 of FIG. 16 which is comprised of an AND gate 11-1 for the purpose of generating a low speed distribution command signal $S_8$ when the low speed distribution command signal $S_7$ and the decelerating command signal $S_L$ (which are respectively logical 1 simultaneously) which signal is, in turn, applied to distributor 2. The time relationships among the signals $S_8$, $S_2$ and $S_9$ are shown by the waveforms of FIG. 17d.

An explanation of the system of FIG. 1 employing the circuit embodiments of FIGS. 8, 9, 10 and 16 will now be explained:

FIGS. 18a, 18b and 18c are similar to FIGS. 13a through 13c respectively and show the relationship between the droop D and the operating point $P_p(\theta, \phi_p)$ and alarm point $P_A(\theta, \phi_A)$, as well as their relationship to the alarm signal $S_4$, the reference signal $S_R$ and the distribution control signal $S_5$. The positioning phase signal $\phi_p$, alarm phase signal $\phi_A$, operating point $P_0$–$P_2$ and $A_0$–$A_2$ of FIG. 18a correspond respectively to the similarly designated signals and operating points of FIG. 13a while the signal $S_{4-1}$, reference signal $S_R$ and distribution control signal $S_5$ of FIGS. 18b and 18c correspond respectively to those shown in FIGS. 13b and 13c.

In the case where the decelerating command signal $S_L$ is not supplied (i.e. is logical 0), no controlled low speed command signal $S_8$ is generated by gate circuit 11 due to the fact that the absence of signal $S_L$ blocks AND gate 11-1. The modified distribution control signal $S_6$ of circuit 9 (also shown in FIG. 17a) which is expressed by the above mentioned logical Equation 1 becomes $S_6=S_5$. This is due to the fact that the absence of signal $S_L$ (logical 0) is inverted by inhibit gate 9-3 to become logical 1 which is combined with signal $S_5$ in AND gate 9-1 to develop the signal $S_5$ at the output terminal, thereby making $S_6=S_5$. The logical zero state of signal $S_L$ blocks AND gate 9-2. As a result the operation illustrated in FIG. 18 is quite the same as that illustrated in FIG. 13 with respect to the system of FIG. 1.

In the case where the decelerating command signal $S_L$ is present (i.e. is logical 1) this signal is applied as one input of logic circuit 9 and, if the operating point $P_p$ is situated at point $P_3$ of FIG. 18a, then circuit 9 generates the modified distribution control signal $S_6$ expressed by the logical Equation 1 since the distribution control signal $S_5$ is in the state of logical 0 as shown in FIG. 18c; this means that gate 9-1 is blocked due to signal $S_5$ being in a state of logical 0 while its inverted state applied through inhibitor 9-4 to AND gate 9-2 permits signal $S_L$ to be passed by AND gate 9-2 such that signal $S_6$ is equal to $S_L$. The distribution control circuit 8 receives the modified distribution control signal $S_6$ as an input and discontinues the generation of controlled distribution command signal $S_2$. On the other hand the gate circuit 11 generates the controlled low speed distribution command signal $S_8$ due to the presence (i.e. logical 1 state) of the decelerating command signal $S_L$. At this time the output signal $S_9$ applied to the input of distributor circuit 2 becomes $S_9=S_8$. In the system shown in FIG. 1, when the controlled distribution command signal $S_2$ is suppressed in the manner described hereinabove, the driving equipment 3 operates so as to reduce the droop $D_3$, and the operating point $P_p$ proceeds toward the stable point $P_0$. However, since the kinetic energy of the driving system is great, and—when the above-described occurrence/time ratio of the controlled low speed distribution command signal $S_8$ which is generated in place of the controlled distribution command signal $S_2$ is sufficiently low in time occurrence compared with an occurrence/time ratio of the controlled distribution command signals $S_2$—since the movement of the controlled member 4 which has been in a state of equilibrium with the latter ratio is much faster than the former, then the point $P_p$ passes through the point $P_0$ and proceeds toward the point $P_4$ as shown in FIG. 18a. As a result the driving system generates a droop of inverse direction which acts to pull back to the point $P_0$ and causes a sudden damping action to occur in the system. However, the kinetic energy of the driving system, if significantly large, surpasses the work due to the damping action, and makes the point $P_p$ proceed to $P_4 \to P_2 \to_5$, and the droop is increased and the point $P_A$ proceeds to $A_4 \to A_2 \to A_5$ corresponding with the point $P_p$. In this example, the movement of the point past $P_2$ acts as a turning point since the alarm signal $S_4$ is less than the reference signal $S_R$ as shown in FIG. 18b so that the distribution control signal $S_5$ becomes logical 1 as shown in FIG. 18c. Since the decelerating command signal $S_L$ is maintained at logical 1, the modified distribution control signal $S_6$ expressed by logical Equation 1 is logical 0, and the distribution control circuit 8 is thereby free to generate the controlled distribution command signal $S_2$. Consequently the distribution signal $S_3$ is generated and the point $P_p$ proceeds to the point $P_3$. If the droop becomes smaller than $D_2$, the distribution control signal $S_5$ becomes logical 0 again and the controlled distribution command signal $S_2$ is suppressed causing the point $P_p$ to proceed again toward the point $P_2$.

Until the above mentioned kinetic energy is consumed owing to the repetition of the above action, the point $P_p$ remains in the vicinity of the point $P_2$ and, during this period, the controlled member 4 has a great influence upon the damping action. When the kinetic energy has been consumed, the point $P_p$ no longer passes through the point $P_2$, and the controlled member 4 becomes settled at the feed rate corresponding to the occurrence/time ratio of the controlled low speed distribution command signal $S_8$. The droop at the time of deceleration in this example is held to be within the value $D_2$ as shown in FIG. 18a. In addition, when the occurrence/time ratio of the controlled distribution command signal $S_2$ is lower than the occurence/time ratio of the low speed distribution command signal $S_7$ no deceleration command signal $S_L$ is applied to the equipment shown in FIG. 16 because no deceleration operation is needed.

An explanation will now be given of the circuitry which may be employed for generating the decelerating command signal $S_L$ which is employed in the modified arrangement shown in FIG. 16.

Figure 20A:
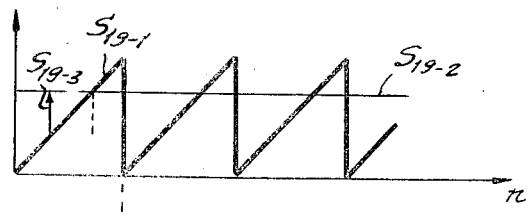

FIG. 19 illustrates the structure employed in the generating means for decelerating command signal $S_L$ while FIGS. 20a through 20d are plots showing the waveforms produced by the various circuits employed in the generating means of FIG. 19. The circuitry of FIG. 19 is comprised of a multi-stage counter 19-1 having a capacity of a specified number of bits, in which the number $n$ of the distribution signal $S_3$ has been preset. Each time the distribution signal $S_3$ is applied to the input of counter 19-1 the preset content $n$ is reduced 1 bit for each distribution signal $S_3$ applied thereto. A conventional digital to analog converter 19-2 has its input terminals connected to those stages of the counter which store bits below the predetermined preset value and generates a voltage signal $S_{19-1}$ corresponding to the number of bits. An example of voltage signal $S_{19-1}$ is illustrated in FIG. 20a. Thus the analog signal developed by circuit 19-2 increases until the preset amount is reduced to 0 at which time the voltage value abruptly drops to 0 and a new count is begun thereby generating the saw tooth type waveform $S_{19-1}$.

A second digital to analog converter 19-8 generates a voltage signal $S_{19-2}$ corresponding to an occurrence/time ratio of the distribution command signal $S_1$. An example of the voltage signal $S_{19-2}$ is shown in FIG. 20a. Thus the command signal which may be applied to the distribution signal generator circuit 1 of FIG. 1 in digital form is converted into analog form by circuit 19-3.

Figure 20B:
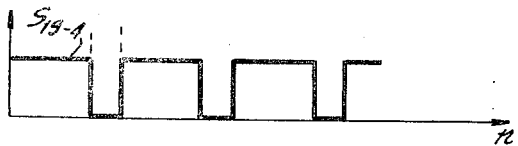
Figure 20C:
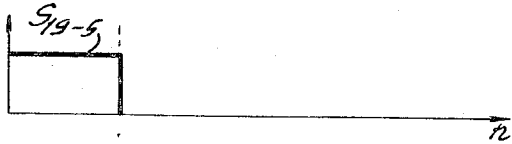
Figure 20D:
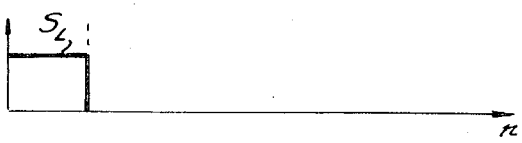

A conventional differential amplifier 19-4 generates a voltage signal $S_{19-3}$ (see FIG. 20a) which represents the difference between the voltage signals $S_{19-1}$ and $S_{19-2}$. A Schmitt circuit 19-5 generates an output signal $S_{19-4}$ having a value of logical 1 when the output signal $S_{19-3}$ surpasses the preset level of the Schmitt circuit. FIG. 20b shows an example of the signal $S_{19-4}$ in the case when the preset level of the Schmitt circuit is assumed to be 0. When the value of those bits in multi-stage counter 19-1 higher than that of the preset position (and including as well the preset position) becomes 0, a logical circuit 19-6 comprised of a plurality of AND gates generates an output signal $S_{19-5}$ having a value of logical 1. An example of the output signal $S_{19-5}$ is shown in FIG. 20c. When both of the output signals $S_{19-4}$ and $S_{19-5}$ are logical 1 AND gate 19-7 generates the decelerating command signal $S_L$, an example of which is shown in FIG. 20d. As explained above, the decelerating command signal $S_L$ is generated according to both the occurrence/time ratio of the distribution command signal $S_L$ and the value of the above described counter 19-1. The circuit of FIG. 19 for generating the decelerating command signal $S_L$ may be contained in the distributor circuit of FIG. 1 of a conventional numerical control device and the decelerating command signal $S_L$ is then obtained from the distributor 2.

Whereas the description of the invention set forth herein has been limited to a system comprised of driving equipment employed in conjunction with a single set of the circuits 5 through 8, it should be understood that other combinations of the means or devices of the present invention may be provided for without departing from the spirit or scope of the invention. For example in an application employing a complex digital control system where distribution signals for multiple axes may be required the system of FIG. 1 for example may be modified to generate distribution signals $S_{3X}$, $S_{3Y}$ and $S_{3Z}$ for X axis, Y axis and Z axis signals respectively wherein driving equipment would be provided for each axis to perform the three dimensional movement of the controlled member. In such an example separate groups of the circuits 5-7 of FIG. 1 would be provided for each of the X, Y and Z driving equipment means and a signal representing the logical sum of the distribution control signals $S_{5X}$, $S_{5Y}$ and $S_{5Z}$ which are obtained for each axis would then be applied to the distribution control circuit 8 in place of a single distribution control signal $S_5$ as shown in FIG. 1.

Various other modifications of the elements of the present invention are therefore not limited to only the embodiments explained in detail herein with reference to the drawings and many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A polyphase selection digital driving system for driving a controlled member comprising:
   a distribution command device for generating distribution command signals at time intervals which are inversely proportional to a command feed rate established by first information applied to the distribution command device which specifies the command feed rate for the controlled member;
   first means coupled to said distribution command device for generating a controlled distribution command signal;
   distributor means coupled to said first means for generating a distribution signal in accordance with a specified method of distribution under control of second information applied to said distributor;
   driving equipment comprising:
      driving means for driving said controlled member;
      a polyphase detector mechanically coupled to said driving means for generating a plurality of detection signals having predetermined phase relationships relative to one another;
      positioning phase selector means for successively selecting one of said group of detection signals in response to the distribution signal from said distributor means, said selected phase signal being applied to said driving means as a positioning phase signal for driving said driving means in response thereto;
   second means coupled to said polyphase detector and said distributor means for generating an alarm phase signal selected from among said detection signals under control of said distribution signal wherein said selected alarm phase signal has a predetermined phase relationship relative to said positioning phase signal;
   third means coupled to said means for generating a distribution control signal when the magnitude of said alarm signal is greater than a predetermined value, said distribution control signal being applied to said first means for inhibiting the passage of distribution command signals to said distributor means when the magnitude of said alarm signal is greater than said prescribed value.

2. The system of claim 1 wherein said distributor means includes fourth means for generating a distribution signal indicating the desired rate of movement of said controlled member and includes means for generating a signal indicating the direction of the rate of movement of said control member in accordance with the second information applied thereto which controls the direction in which the controlled member is to be moved.

3. The system of claim 2 wherein said phase selector means is comprised of reversible counter means stepped at a rate controlled by the distribution signal and in the direction controlled by the distribution directional signals and further comprised of gating means each receiving one of said detection signals and one output of said reversible counter means for enabling only one of said detection signals to be applied to said driving means at any given instant.

4. The system of claim 2 wherein said second means is further comprised of reversible counter means receiving said distribution signal from said distributor means for determining the rate at which said counter is stepped and for receiving the directional signals for determining the direction in which said counter is to be stepped and further comprising a plurality of gating means each receiving one of said detection signals and one output of said reversible counter means for enabling only one of said detection signals to be passed to said third means at any given instant.

5. The system of claim 4 wherein said third means is comprised of differential amplifier means for generating an alarm signal whenever the magnitude of the selected detection signal is greater than a preset reference level.

6. The system of claim 2 wherein said second means is comprised of a reversible counter means receiving the distribution signal to determine the rate of stepping of said counter means and receiving said directional signal to determine the direction of stepping of said counter means and further comprising first and second groups of AND gates each of which receives one of said detection signals and one output of said counter means;

said first group of AND gates being enabled by the presence of a positive going directional signal to enable the passage of only one of said detection signals at any given instant;

said second group of AND gates being enabled to pass only one of said detection signals upon the occurrence of a negative directional signal;

the detection signal passed by said first group of AND gates having a predetermined phase difference relative to said positioning phase signal;

the phase detection signal passed by said second group of AND gates having a second predetermined phase relationship relative to said positioning phase signal.

7. The system of claim 1 further comprising means coupled to said distribution command device and said distributor means for generating a decelerating command signal when the command rate indicates that the controlled member should be decelerated;

fourth means comprising exclusive OR gating means for receiving said deceleration command signal and said alarm signal and for applying either said deceleration command signal or said alarm signal to said first means when either of said signals are present but not both;

fifth means coupled to said distribution command device and receiving deceleration command signal for generating command signals at a reduced rate relative to said distribution command device in the presence of said deceleration command signal, said signals of reduced rate being applied to said distributor means which operates under control of either said reduced rate signals or said distribution command signals depending upon whether the controlled member is to be operated in an accelerating or decelerating manner.

References Cited

UNITED STATES PATENTS

| | | | |
|---|---|---|---|
| 2,927,735 | 3/1960 | Scuitto | 318—20.11 X |
| 3,109,974 | 11/1963 | Hallmark | 318—20.11 X |
| 3,138,750 | 6/1964 | Borger et al. | 318—20.07 |
| 3,270,262 | 8/1966 | Milkenkorie et al. | 318—20.07 |

THOMAS E. LYNCH, Primary Examiner

U.S. Cl. X.R.

318—30, 162